（12） United States Patent
Sasakawa et al.

(10) Patent No.: US 9,343,711 B2
(45) Date of Patent: May 17, 2016

(54) POSITIVE ELECTRODE ACTIVE MATERIAL FOR NON-AQUEOUS ELECTROLYTE SECONDARY BATTERY, NON-AQUEOUS ELECTROLYTE SECONDARY BATTERY, BATTERY PACK, AND METHOD FOR MANUFACTURING POSITIVE ELECTRODE ACTIVE MATERIAL FOR NON-AQUEOUS ELECTROLYTE SECONDARY BATTERY

(75) Inventors: Tetsuya Sasakawa, Yokohama (JP); Hiroki Inagaki, Kawasaki (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 404 days.

(21) Appl. No.: 13/231,255

(22) Filed: Sep. 13, 2011

(65) Prior Publication Data

US 2012/0077064 A1    Mar. 29, 2012

(30) Foreign Application Priority Data

Sep. 24, 2010  (JP) .................. 2010-214424
May 27, 2011  (JP) .................. 2011-119464

(51) Int. Cl.
*H01M 4/505*   (2010.01)
*H01M 4/525*   (2010.01)
(Continued)

(52) U.S. Cl.
CPC .................. *H01M 2/02* (2013.01); *H01M 2/10* (2013.01); *H01M 4/505* (2013.01); *H01M 4/525* (2013.01); *H01M 10/48* (2013.01); *Y02E 60/122* (2013.01); *Y02P 70/54* (2015.11)

(58) Field of Classification Search
CPC .................................. H01M 4/50; H01M 4/52
USPC .................................... 429/400–535
See application file for complete search history.

(56) References Cited

U.S. PATENT DOCUMENTS

2003/0108793 A1   6/2003  Dahn et al.
2004/0091779 A1*  5/2004  Kang et al. ................ 429/231.1
(Continued)

FOREIGN PATENT DOCUMENTS

JP      2005-251716 A     9/2005
JP      2012-038562 A     2/2012
WO   WO 2010/039732 A2   4/2010

OTHER PUBLICATIONS

Michael M. Thackeray et al., "$Li_2MnO_3$ -Stabilized $LiMO_2$ (M = Mn, Ni, Co) Electrodes for Lithium-Ion Batteries", Journal of Materials Chemistry, vol. 17, 2007, pp. 3112-3125.

(Continued)

*Primary Examiner* — James Lee
(74) *Attorney, Agent, or Firm* — Oblon, McClelland, Maier & Neustadt, L.L.P.

(57) ABSTRACT

According to one embodiment, it is provided with a positive electrode active material for a non-aqueous electrolyte secondary battery represented by a general formula $Li(Li_aMn_bNi_cCo_dFe_e)O_{2-x}F_x$, wherein a, b, c, d, e and x in the general formula are values such that $0<a\leq 0.33$, $0<b\leq 0.67$, $0\leq c<1$, $0\leq d<1$, $0\leq e<1$ and $0.1\leq x\leq 1-b$, and the following formula (1) is satisfied:

$$3 \leq \frac{3-x-a-2c-3d-3e}{b} < 4. \quad (1)$$

17 Claims, 12 Drawing Sheets

(51) Int. Cl.
*H01M 2/02* (2006.01)
*H01M 2/10* (2006.01)
*H01M 10/48* (2006.01)

(56) References Cited

U.S. PATENT DOCUMENTS

2005/0106462 A1* 5/2005 Jordy et al. ............... 429/231.1
2008/0206649 A1* 8/2008 Kawashima ............... 429/324
2009/0029249 A1* 1/2009 Takami et al. ............... 429/188
2010/0086854 A1* 4/2010 Kumar et al. ............... 429/223

OTHER PUBLICATIONS

S.-H. Kang et al., "Layered Li(Li$_{0.2}$Ni$_{0.15+0.5z}$Co$_{0.10}$Mn$_{0.55-0.5z}$)O$_{2-z}$F$_z$ Cathode Materials for Li-Ion Secondary Batteries", Journal of Power Sources, vol. 146, 2005, pp. 654-657.

Office Action issued Jun. 27, 2014 in Japanese Patent Application No. 2011-119464 (with English language translation).

* cited by examiner

POSITIVE ELECTRODE ACTIVE MATERIAL FOR NON-AQUEOUS ELECTROLYTE SECONDARY BATTERY, NON-AQUEOUS ELECTROLYTE SECONDARY BATTERY, BATTERY PACK, AND METHOD FOR MANUFACTURING POSITIVE ELECTRODE ACTIVE MATERIAL FOR NON-AQUEOUS ELECTROLYTE SECONDARY BATTERY

CROSS REFERENCE TO RELATED APPLICATION(S)

The application is based upon and claims the benefit of priorities from Japanese Patent Application No. 2010-214424 filed on Sep. 24, 2010 and Japanese Patent Application No. 2011-119464 filed on May 27, 2011; the entire content of which are incorporated herein by reference.

FIELD

Embodiments described herein relate generally to a positive electrode active material for a non-aqueous electrolyte secondary battery, a non-aqueous electrolyte secondary battery, a battery pack, and a method for manufacturing the positive electrode active material for the non-aqueous electrolyte secondary battery.

BACKGROUND

As the application of lithium-ion secondary batteries to electric vehicles and hybrid electric vehicles advances, the necessity for higher energy density increases. At present, while $LiCoO_2$ and the like are put to practical use as the positive electrode material, to increase the capacity of the lithium-ion secondary batteries, a higher-capacity positive electrode active material is indispensable.

As a positive electrode material satisfying such a demand, in recent years, a lithium excess layered manganese-nickel positive electrode represented by $zLi_2MnO_3$-$(1-z)LiMO_2$ has widely been studied. Here, M stands for a transition metal, and $zLi_2MnO_3$-$(1-z)LiMO_2$ can also be represented as a general formula $Li(Li_aMn_bM_c)O_2$. Since it is difficult for Mn to take a valence higher than quadrivalence, normally, $Li_2MnO_3$ having only quadrivalent Mn is electrochemically inactive. However, by charging it up to not less than 4.6 V with reference to lithium, a reaction occurs in which oxygen is desorbed simultaneously with lithium, which makes it electrochemically active. For this reason, $Li_2MnO_3$ exhibits a capacity of not less than 200 mAh/g by forming a solid solution with $LiMO_2$. However, since the desorption reaction of oxygen is irreversible at the time of the initial charging, a high irreversible capacity is caused, which necessitates an excessive weight of negative electrode active material.

To reduce the initial irreversible capacity, an attempt has been made to previously remove, by using an acid such as nitric acid, a certain amount of lithium and oxygen that cause the irreversible capacity. However, with the above-described method, a surface structure of the active material is destroyed by the acid and a cycle characteristic of the battery is degraded as a consequence thereof.

BRIEF DESCRIPTION OF THE DRAWINGS

Embodiments of the present invention will be described in detail based on the following figures, wherein.

DETAILED DESCRIPTION

Figure 1:
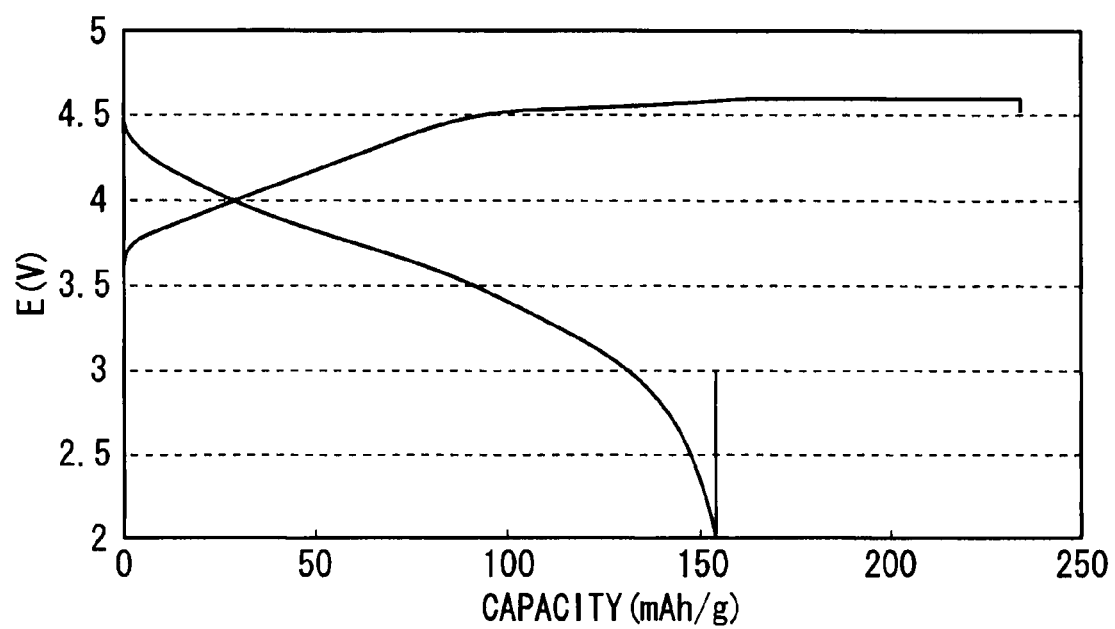
FIG. 1 shows an initial charge and discharge curve by Example 1.
Figure 2:
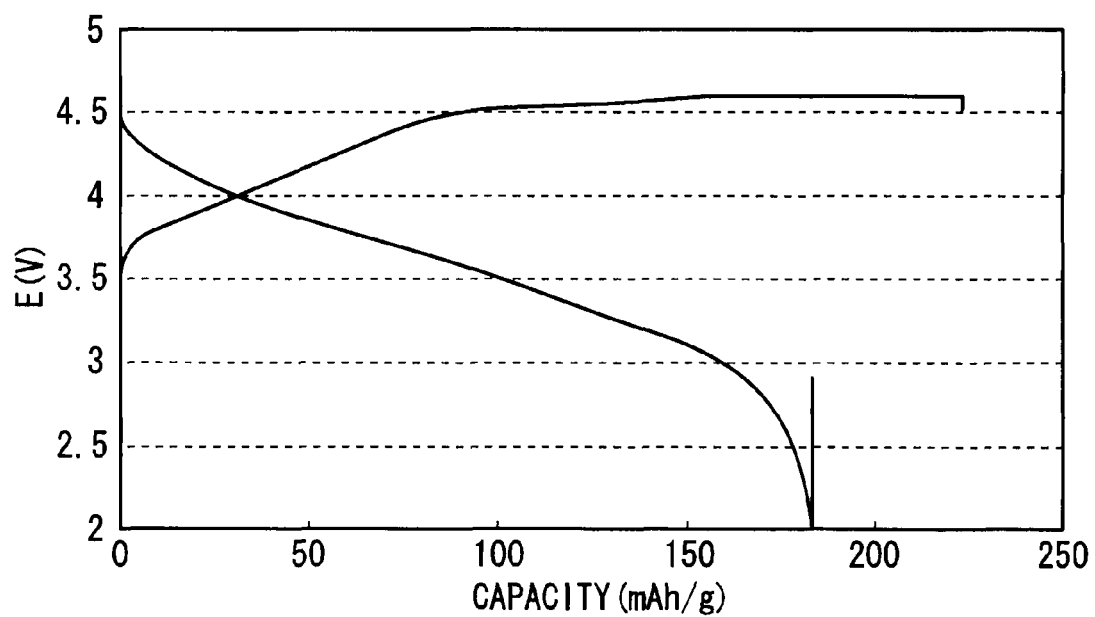
FIG. 2 shows an initial charge and discharge curve by Example 2.
Figure 3:
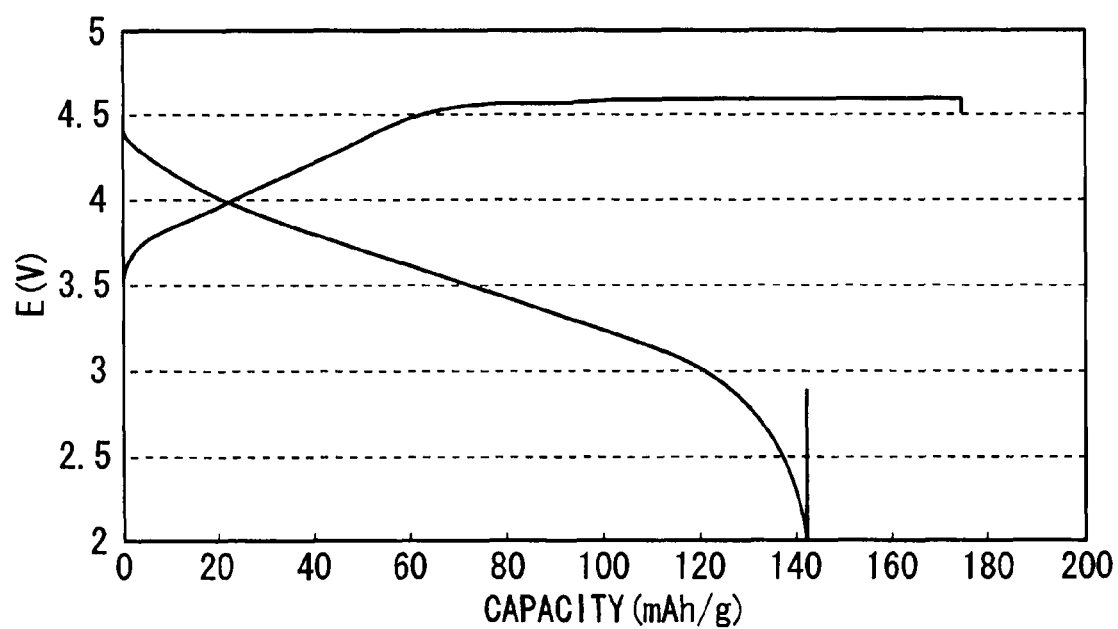
FIG. 3 shows an initial charge and discharge curve by Example 3.

In general, according to one embodiment, it is provided with a positive electrode active material for a non-aqueous electrolyte secondary battery represented by a general formula $Li(Li_aMn_bNi_cCo_dFe_e)O_{2-x}F_x$, wherein a, b, c, d, e and x in the general formula are values such that $0<a\leq0.33$, $0<b\leq0.67$, $0\leq c<1$, $0\leq d<1$, $0\leq e<1$ and $0.1\leq x\leq1-b$, and the following formula (1) is satisfied:

$$3 \leq \frac{3-x-a-2c-3d-3e}{b} < 4 \quad (1)$$

Hereinafter, embodiments will be described with reference to the drawings.

First Embodiment

A positive electrode active material of the first embodiment is a positive electrode active material for a non-aqueous electrolyte secondary battery represented by a general formula $Li(Li_aMn_bNi_cCo_dFe_e)O_{2-x}F_x$. In the general formula, a, b, c, d, e and x are values such that $0<a\leq0.33$, $0<b\leq0.67$, $0\leq c<1$, $0\leq d<1$, $0\leq e<1$ and $0.1\leq x\leq1-b$, and the following formula (1) is satisfied:

$$3 \leq \frac{3-x-a-2c-3d-3e}{b} < 4 \quad (1)$$

Here, the formula (1) shows that in the above general formula, the average valence of Mn when Li is univalent, Ni is divalent and Co and Fe are trivalent is not less than trivalence and less than quadrivalence. Moreover, the above general formula can also be represented as $zLi_2MnO_3$-$\zeta F_\zeta$-$(1-z)Li(Mn_\beta Ni_\kappa Co_\delta Fe_\epsilon)O_2$ as a solid solution of $Li_2MnO_3$ and $LiMO_2$.

In a case where the average valence of Mn is not less than trivalence and less than quadrivalence, the following effect is obtained when Mn is used as the positive electrode active material of a non-aqueous electrolyte secondary battery: It is considered that by the valence of Mn in the $Li_2MnO_3$ component in the active material being partly made trivalent, at the time of the initial charging, an oxidation reaction from $Mn^{3+}$ to $Mn^{4+}$ occurs due to the desorption of lithium and as a consequence thereof, the irreversible oxygen desorption reaction can be reduced. In a case where the average valence of Mn is less than trivalence, a disadvantage occurs in that the crystal structure is unstable. Moreover, in a case where the average valence of Mn is not less than quadrivalence, a disadvantage occurs in that the oxidation reaction of Mn is not used in the initial charging process and the irreversible oxygen desorption reaction cannot be reduced. Moreover, since in the $Li(Mn_\beta Ni_\kappa Co_\delta Fe_\epsilon)O_2$ component, only the oxidation reaction of the transition metal occurs in the initial charging process, the influence of the composition ratio of Mn, Ni, Co and Fe on the initial coulombic efficiency is small, so that various composition ratios can be obtained.

The average valence of Mn can be measured, for example, by X-ray photoelectron spectroscopy.

Moreover, whether the positive electrode active material has the composition of the formula (1) or not can be measured by the following method:

Mn, Ni, Co and Fe can be measured by the ICP/MS method, and Li and F can be measured by ion chromatography. As the pretreatment for carrying out these measurement methods, the positive electrode active material is dissolved in aqua regia, and analysis is performed by the above-mentioned methods. Moreover, O can be measured by Auger electron spectroscopy.

Second Embodiment

A method for manufacturing a positive electrode active material in a second embodiment will be described.

As materials, a transition metal hydroxide, lithium hydroxide and ammonium fluoride are used. The transition metal hydroxide can be obtained by dropping, into a lithium hydroxide aqueous solution, an aqueous solution where manganese nitrate, nickel nitrate, cobalt nitrate and iron nitrate are mixed according to the stoichiometric proportion, and coprecipitating the aqueous solution.

The obtained transition metal hydroxide is mixed with lithium hydroxide and ammonium fluoride, and fired in an oxidation atmosphere at a temperature between 700 degrees C. and 1000 degrees C. for a period of time between five hours to 48 hours, whereby the positive electrode active material can be obtained.

Third Embodiment

A non-aqueous electrolyte secondary battery according to a third embodiment will be described.

The non-aqueous electrolyte secondary battery according to the embodiment is provided with: a container; a positive electrode accommodated in the container; a negative electrode including an active material accommodated in the container so as to be spatially separated from the positive electrode, for example, through a separator; and a non-aqueous electrolyte filled in the container.

Figure 8:
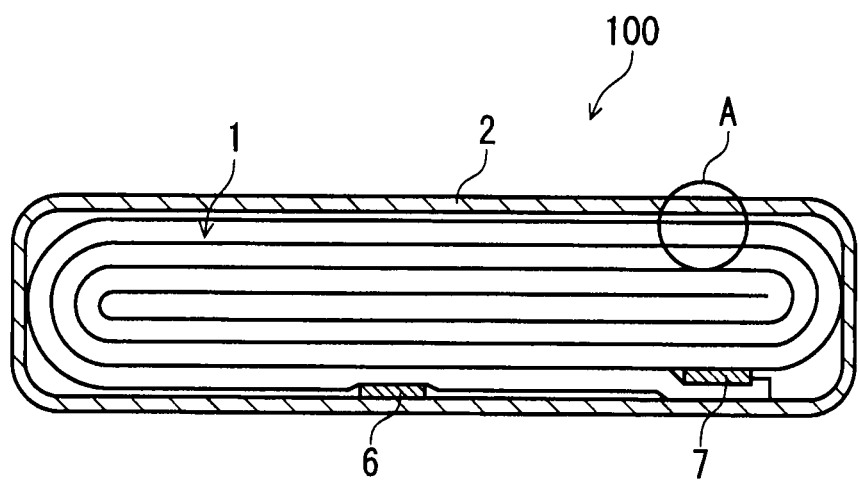
FIG. 8 is a cross-sectional view showing a flat non-aqueous electrolyte battery according to a third embodiment.
Figure 9:
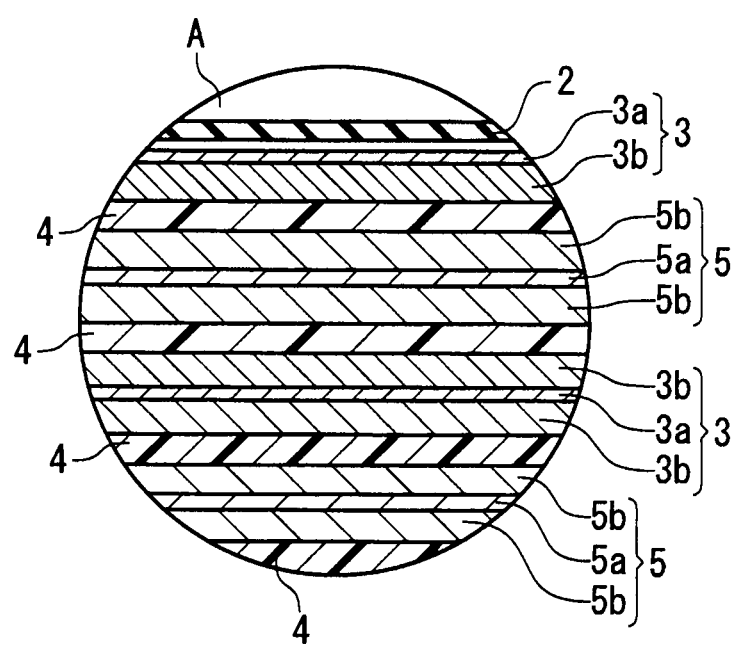
FIG. 9 is an enlarged cross-sectional view of a part A of FIG. 8.

A more detailed description will be given with reference to FIGS. 8 and 9 showing an example of the non-aqueous electrolyte secondary battery 100 according to the embodiment. FIG. 8 is a schematic cross-sectional view of the flat non-aqueous electrolyte secondary battery 100 the container 2 of which is formed of a laminate film. FIG. 9 is an enlarged cross-sectional view of a part A of FIG. 8. While FIGS. 8 and 9 are schematic views for explanation and some shapes, dimensions, proportions and the like thereof are different from those of the actual device, design changes may be made thereto as appropriate in consideration of the description given below and known technologies.

A flat winding electrode group 1 is accommodated in the sack-like container 2 formed of a laminate film in which an aluminum foil is interposed between two resin layers. To form the flat winding electrode group 1, a lamination in which the negative electrode 3, the separator 4, the positive electrode 5 and the separator 4 are laminated in this order from the outside is spirally wound and press-formed. The outermost part of the negative electrode 3 has a structure in which a negative electrode layer 3b is formed on one surface, on the inner side, of a negative electrode collector 3a as shown in FIG. 9. The remaining part of the negative electrode 3 has a structure in which the negative electrode layer 3b is formed on both surfaces of the negative electrode collector 3a. The active material in the negative electrode layer 3b contains the active material for a battery according to the first embodiment. The positive electrode 5 has a structure in which a positive electrode layer 5b is formed on both surfaces of a positive electrode collector 5a.

In the vicinity of an outer end of the winding electrode group 1, a negative electrode terminal 6 is electrically connected to the negative electrode collector 3a of the outermost negative electrode 3, and a positive electrode terminal 7 is electrically connected to the positive electrode collector 5a of the positive electrode 5. These negative and positive electrode terminals 6 and 7 outwardly extend from an opening of the container 2. For example, a liquid non-aqueous electrolyte is filled from the opening of the sack-like container 2. The opening of the sack-like container 2 is heat-sealed with the negative electrode terminal 6 and the positive electrode terminal 7 in between to thereby completely seal the winding electrode group 1 and the liquid non-aqueous electrolyte.

Examples of the material of the negative electrode terminal 6 include aluminum and an aluminum alloy containing an element such as Mg, Ti, Zn, Mn, Fe, Cu or Si. To reduce the contact resistance with the negative electrode collector 3a, it is desirable that the material of the negative electrode terminal 6 be similar to that of the negative electrode collector 3a.

For the positive electrode terminal 7, a material can be used that has electrical stability and conductivity in a range where the potential for lithium-ion metals is 3 to 4.25 V. Specific examples include aluminum and an aluminum alloy containing an element such as Mg, Ti, Zn, Mn, Fe, Cu or Si. To reduce the contact resistance with the positive electrode collector 5a, it is desirable that the material of the positive electrode terminal 7 be similar to that of the positive electrode collector 5a.

Hereinafter, the container 2, the negative electrode 3, the positive electrode 5, the separator 4 and the non-aqueous electrolyte which are constituent members of the non-aqueous electrolyte secondary battery 100 will be described in detail.

1) Container

The container 2 is formed of a laminate film with a thickness of not more than 0.5 mm. Alternatively, a metal case with a thickness of not more than 1.0 mm is used as the container. It is desirable that the thickness of the metal case be not more than 0.5 mm.

The shape of the container 2 may be selected from among a flat shape (thin shape), an angular shape, a cylindrical shape, a coin shape and a button shape. Examples of the container include, according to the battery size, a container for small-size batteries loaded in portable electronic apparatuses and the like and a container for large-size batteries loaded in two- to four-wheel vehicles and the like.

As the laminate film, a multilayer film in which a metal layer is interposed between resin layers is used. It is desirable that the metal layer be an aluminum foil or an aluminum alloy foil for weight reduction. For the resin layers, a high polymer material such as polypropylene (PP), polyethylene (PE), nylon or polyethylene terephthalate (PET) may be used. The laminate film can be formed into the shape of the container by performing sealing by thermal fusion bonding.

The metal case is formed of aluminum, an aluminum alloy or the like. It is desirable that the aluminum alloy include an element such as Mg, Zn or Si. When a transition metal such as iron, copper, nickel or chromium is contained in the alloy, it is desirable that the amount thereof be not more than 100 ppm by mass.

2) Negative Electrode

The negative electrode 3 has the collector 3a and the negative electrode layer 3b formed on one surface or both surfaces of the collector 3a and containing an active material, a conductive agent and a binder.

Examples of the negative electrode active material include carbonaceous matter, metallic oxides, metallic sulfides, metallic nitrides and metallic alloys characterized by occluding and releasing lithium ions.

The conductive agent enhances the power collecting performance of the active material and suppresses the contact resistance with the collector. Examples of the conductive agent include acetylene black, carbon black and graphite.

The binder is capable of binding the active material and the conductive agent. Examples of the binder include polytetrafluoroethylene (PTFE), polyvinylidene fluoride (PVdF), fluorine rubber and styrene-butadiene rubber.

It is desirable that the active material, the conductive agent and the binder in the negative electrode layer 3b be mixed with percentages of not less than 70% by mass and not more than 96% by mass, not less than 2% by mass and not more than 28% by mass, and not less than 2% by mass and not more than 28% by mass, respectively. By the amount of the conductive agent being not less than 2% by mass, the power collecting performance of the negative electrode layer 3b is improved, so that the high current characteristics of the non-aqueous electrolyte secondary battery 100 can be improved. Moreover, by the amount of the binder being not less than 2% by mass, the binding property of the negative electrode layer 3b and the collector 3a is enhanced, so that the cycle characteristic can be improved. On the other hand, to increase capacity, it is desirable that the amounts of the conductive agent and the binder be not more than 28% by mass.

It is desirable that the collector 3a be an aluminum foil that is electrochemically stable in a potential range nobler than 1 V or an aluminum alloy foil containing an element such as Mg, Ti, Zn, Mn, Fe, Cu or Si.

To form the negative electrode 3, for example, the active material, the conductive agent and the binder are suspended in a widely used solvent to thereby prepare a slurry, and the slurry is applied to the collector 3a, dried and then, pressed. The negative electrode 3 may also be formed by forming the active material, the conductive agent and the binder in a pellet form into the negative electrode layer 3b and forming the negative electrode layer 3b on the collector 3a.

3) Positive Electrode

The positive electrode 5 has the collector 5a and the positive electrode layer 5b formed on one surface or both surfaces of the collector 5a and containing an active material, a conductive agent and a binder.

As the active material, for example, the positive electrode active material of the first embodiment may be used. Moreover, the positive electrode active material obtained by the manufacturing method described in the second embodiment may be used.

By using these active materials, the initial coulombic efficiency can be improved, so that the weight of the negative electrode is reduced and as a consequence, a non-aqueous electrolyte secondary battery having a high energy density can be provided.

The conductive agent enhances the power collecting performance of the active material and suppresses the contact resistance with the collector. Examples of the conductive agent include carbonaceous matter such as acetylene black, carbon black and graphite.

The binder binds the active material and the conductive agent. Examples of the binder include polytetrafluoroethylene (PTFE), polyvinylidene fluoride (PVdF) and fluorine rubber.

It is desirable that the active material, the conductive agent and the binder in the positive electrode layer 5b be mixed with percentages of not less than 80% by mass and not more than 95% by mass, not less than 3% by mass and not more than 18% by mass, and not less than 2% by mass and not more than 17% by mass, respectively. By the amount of the conductive agent being not less than 3% by mass, the above-mentioned effects can be produced. By the amount of the conductive agent being not more than 18% by mass, the dissolution of the non-aqueous electrolyte on the surface of the conductive agent when the non-aqueous electrolyte is preserved under high temperature can be reduced. By the amount of the binder being not less than 2% by mass, sufficient positive electrode strength is obtained. By the amount of the binder being not more than 17% by mass, the amount of the binder as the insulating material mixed in the positive electrode is reduced, so that the internal resistance can be reduced.

It is desirable that the collector be, for example, an aluminum foil or an aluminum alloy foil containing an element such as Mg, Ti, Zn, Mn, Fe, Cu or Si.

To form the positive electrode 5, for example, the active material, the conductive agent and the binder are suspended in a widely used solvent to thereby prepare a slurry, and the slurry is applied to the collector 5a, dried and then, pressed. The positive electrode 5 may also be formed by forming the active material, the conductive agent and the binder in a pellet form into the positive electrode layer 5b and forming the positive electrode layer 5b on the collector 5a.

4) Non-Aqueous Electrolyte

As the non-aqueous electrolyte, for example, a liquid non-aqueous electrolyte prepared by dissolving an electrolyte in an organic solvent or a gel non-aqueous electrolyte which is a combination of a liquid non-aqueous electrolyte and a high polymer material may be used.

It is desirable that in the liquid non-aqueous electrolyte, the electrolyte be dissolved in the organic solvent at a concentration of not less than 0.5 M and not more than 2.5 M.

Examples of the electrolyte include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethanesulfonate ($LiCF_3SO_3$), lithium bistrifluoromethylsulfonylimide [$LiN(CF_3SO_2)_2$] and combinations thereof. It is desirable that the electrolyte be not easily oxidized even at high potentials, and $LiPF_6$ is the most desirable.

Examples of the organic solvent include: cyclic carbonates such as propylene carbonate (PC), ethylene carbonate (EC) and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolane (DOX); chain ether such as dimethoxyethane (DME) and diethoethane (DEE); γ-butyrolactone (GBL); acetonitrile (AN); and sulfolane (SL). These organic solvents may be used singly or in the form of a mixed solvent.

Examples of the high polymer material include polyvinylidene fluoride (PVdF), polyacrylonitrile (PAN) and polyethylene oxide (PEO).

A desirable organic solvent is a mixed solvent in which at least two from a group consisting of propylene carbonate (PC), ethylene carbonate (EC) and diethyl carbonate (DEC) are mixed, or a mixed solvent containing γ-butyrolactone (GBL). By using these mixed solvents, a non-aqueous electrolyte secondary battery excellent in high temperature characteristics can be obtained.

5) Separator

As the separator 4, for example, a porous film containing polyethylene, polypropylene, cellulose or polyvinylidene fluoride (PVdF), or synthetic resin nonwoven fabric may be used. A desirable porous film is formed of polyethylene or polypropylene. Since the film is dissolved at a certain temperature and capable of shutting off current, safety can be improved.

According to the above-described embodiment, a non-aqueous electrolyte secondary battery having excellent charge and discharge cycle performance can be provided.

Fourth Embodiment

Next, a battery pack according to the embodiment will be described in detail.

The battery pack according to the embodiment has at least one non-aqueous electrolyte secondary battery (that is, cell) according to the above-described third embodiment. When a plurality of cells are included in a battery pack, the cells are disposed in such a way as to be electrically connected in series, in parallel, or in series and in parallel.

The battery pack 200 will concretely be described with reference to FIGS. 10 and 11. In the battery pack 200 shown in FIG. 9, the flat non-aqueous electrolyte battery shown in FIG. 8 is used as the cells 21.

A plurality of cells 21 are layered in such a way that the outwardly extending negative electrode terminal 6 and positive electrode terminal 7 are aligned in the same direction, and are bound by an adhesive tape 22, thereby forming an assembled battery 23. These cells 21 are electrically connected in series as shown in FIG. 11.

A printed circuit board 24 is disposed so as to face the side surfaces of the cells 21 where the negative electrode terminal 6 and the positive electrode terminal 7 extend. The printed circuit board 24 is provided with a thermistor 25, a protecting circuit 26 and a conducting terminal 27 to an external apparatus as shown in FIG. 11. To the surface of the printed circuit board 24 facing the assembled battery 23, an insulating plate (not shown) is attached to avoid unnecessary connection with the wiring of the assembled battery 23.

A positive electrode side lead 28 is connected to the positive electrode terminal 7 situated on the lowermost layer of the assembled battery 23, and an end thereof is inserted into a positive electrode side connector 29 of the printed circuit board 24 and electrically connected with the printed circuit board 24. A negative electrode side lead 30 is connected to the negative electrode terminal 6 situated on the uppermost layer of the assembled battery 23, and an end thereof is inserted into a negative electrode side connector 31 of the printed circuit board 24 and electrically connected with the printed circuit board 24. These connectors 29 and 31 are connected to the protecting circuit 26 through wirings 32 and 33 formed on the printed circuit board 24.

Figure 4:
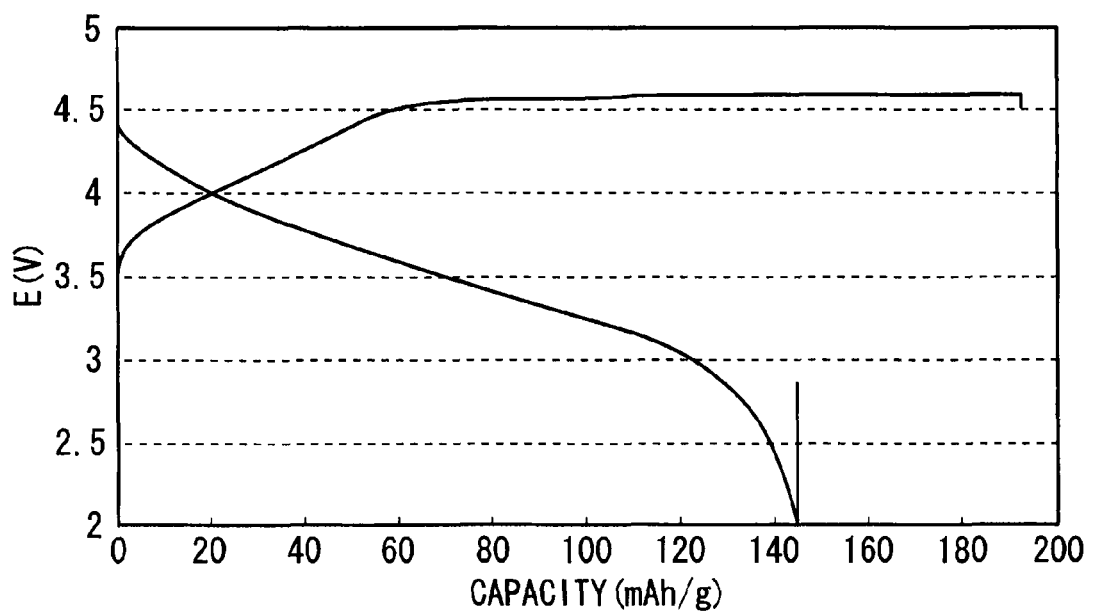
FIG. 4 shows an initial charge and discharge curve by Example 4.
Figure 5:
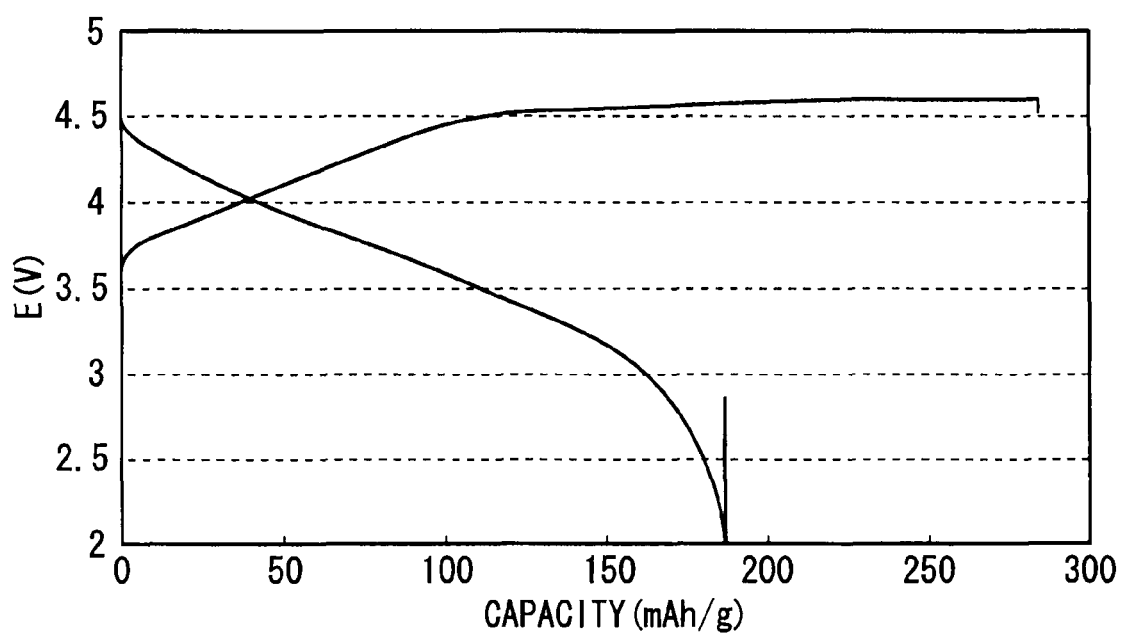
FIG. 5 shows an initial charge and discharge curve by Comparative Example 1.
Figure 6:
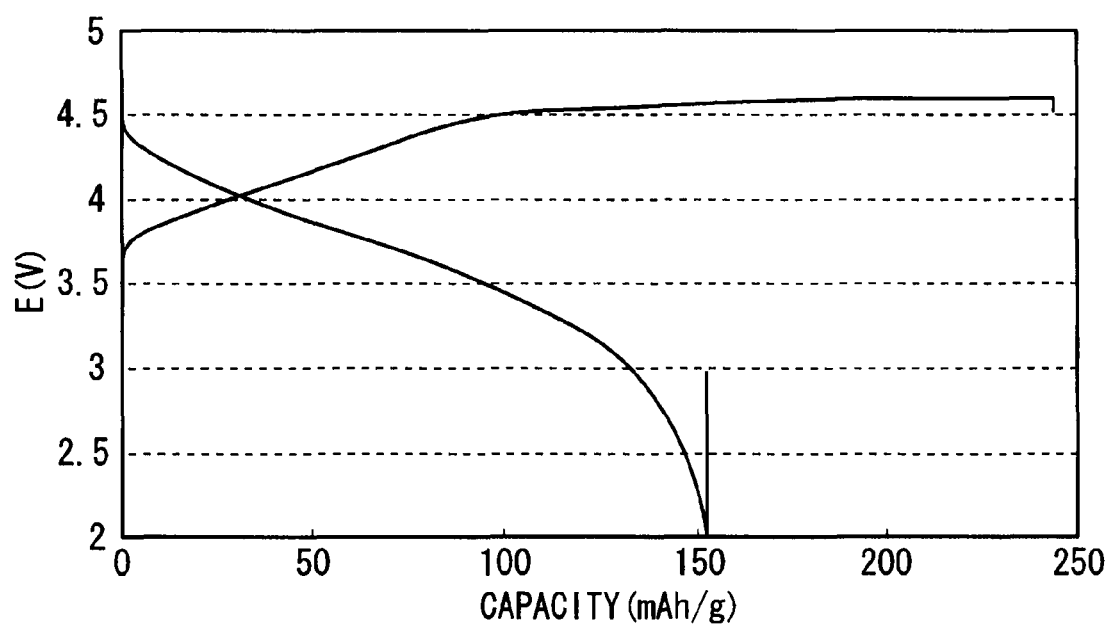
FIG. 6 shows an initial charge and discharge curve by Comparative Example 2.
Figure 7:
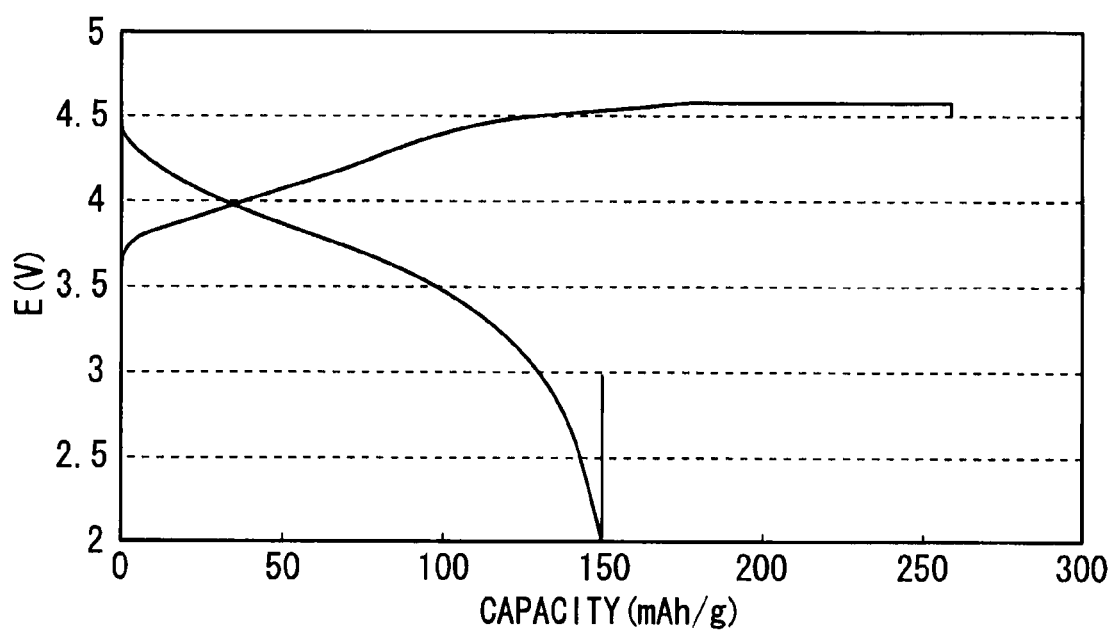
FIG. 7 shows an initial charge and discharge curve by Comparative Example 3.

The thermistor 25 is used for detecting the temperature of the cells 21, and the detection signal thereof is transmitted to the protecting circuit 26. The protecting circuit 26 is capable of interrupting a plus side wiring 34a and a minus side wiring 34b between the protecting circuit 26 and the conducting terminal 27 to an external apparatus under certain conditions. One of the certain conditions is, for example, when the temperature detected by the thermistor 25 becomes a threshold temperature or higher. Moreover, the other certain condition is when an overcharge, an overdischarge, an overcurrent or the like of the cells 21 is detected. The detection of the overcharge and the like is performed on each individual cell 21 or on the whole of the cells 21. When the detection is performed on each individual cell 21, the battery voltage may be detected, or the positive electrode potential or the negative electrode potential may be detected. In the latter case, a lithium electrode used as a reference electrode is inserted into each individual cell 21. In the case of FIGS. 4 and 5, a wiring 35 for voltage detection is connected to each cell 21, and the detection signal is transmitted to the protecting circuit 26 through these wirings 35.

On each of the three side surfaces of the assembled battery 23 except the side surface where the positive electrode terminal 7 and the negative electrode terminal 6 protrude, a protecting sheet 36 formed of rubber or resin is disposed.

The assembled battery 23 is accommodated in a case 37 together with the protecting sheets 36 and the printed circuit board 24. That is, the protecting sheet 36 is disposed on each of both inner surfaces in the longitudinal direction and an inner surface in the width direction of the case 37, and the printed circuit board 24 is disposed on the opposite inner surface in the width direction. The assembled battery 23 is situated in a space surrounded by the protecting sheets 36 and the printed circuit board 24. A lid 38 is attached to the upper surface of the case 37.

To fix the assembled battery 23, a heat shrinkable tape may be used instead of the adhesive tape 22. In this case, protecting sheets are disposed on both side surfaces of the assembled battery, the heat shrinkable tape is wound therearound, and then, the heat shrinkable tape is thermally shrunk to bind the assembled battery.

Figure 10:
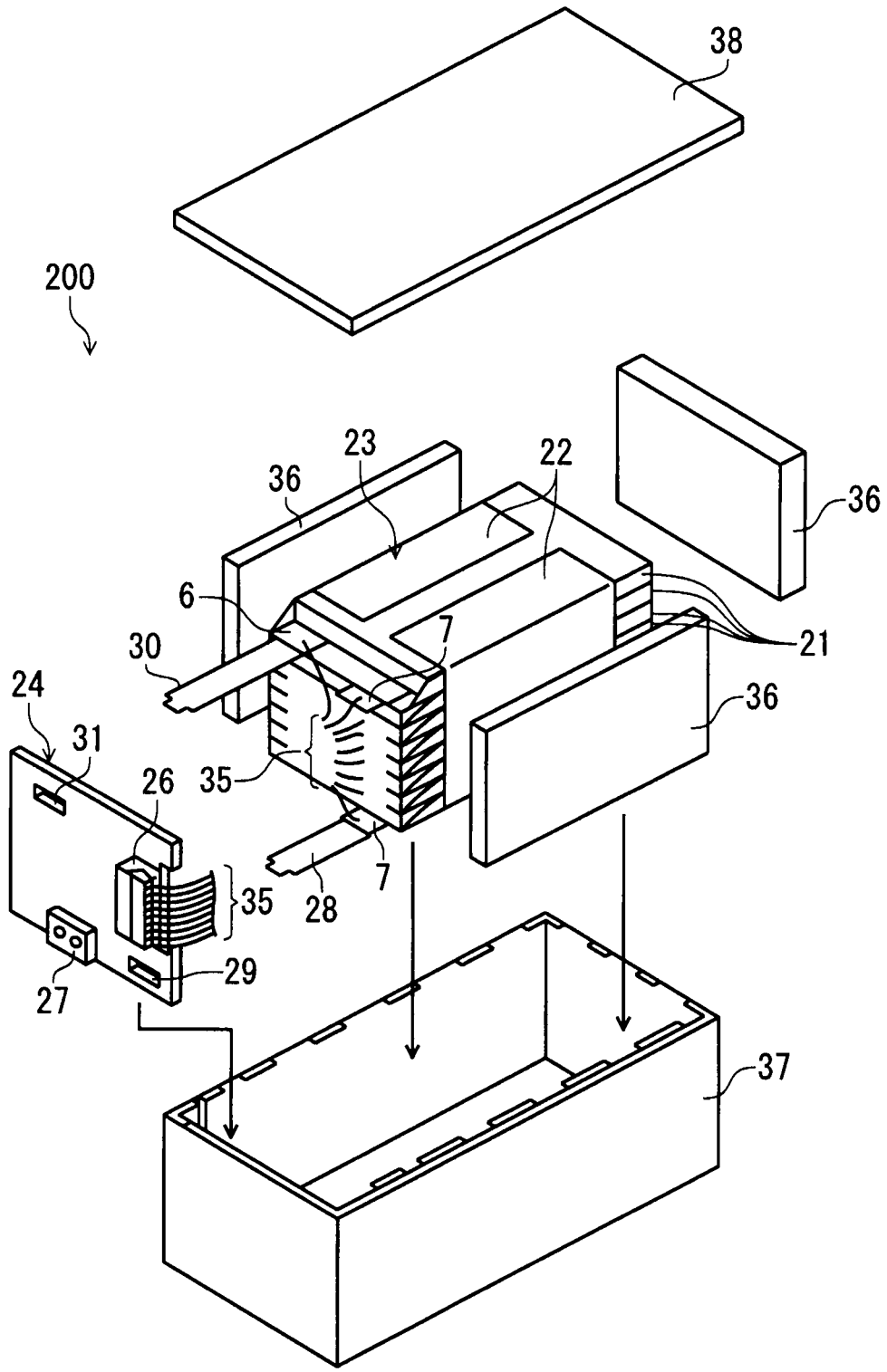
FIG. 10 is an exploded perspective view showing a battery pack according to a fourth embodiment.
Figure 11:
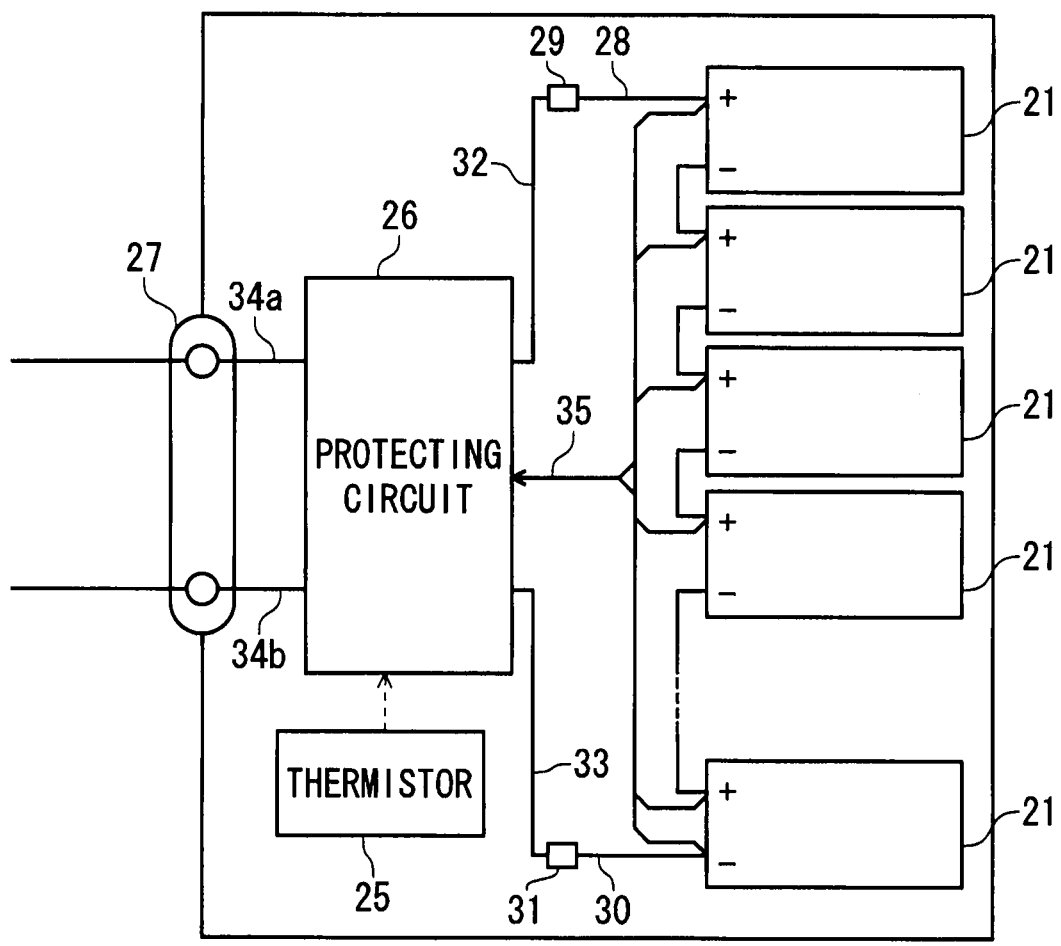
FIG. 11 is a block diagram showing an electric circuit of the battery pack of FIG. 10.
Figure 12:
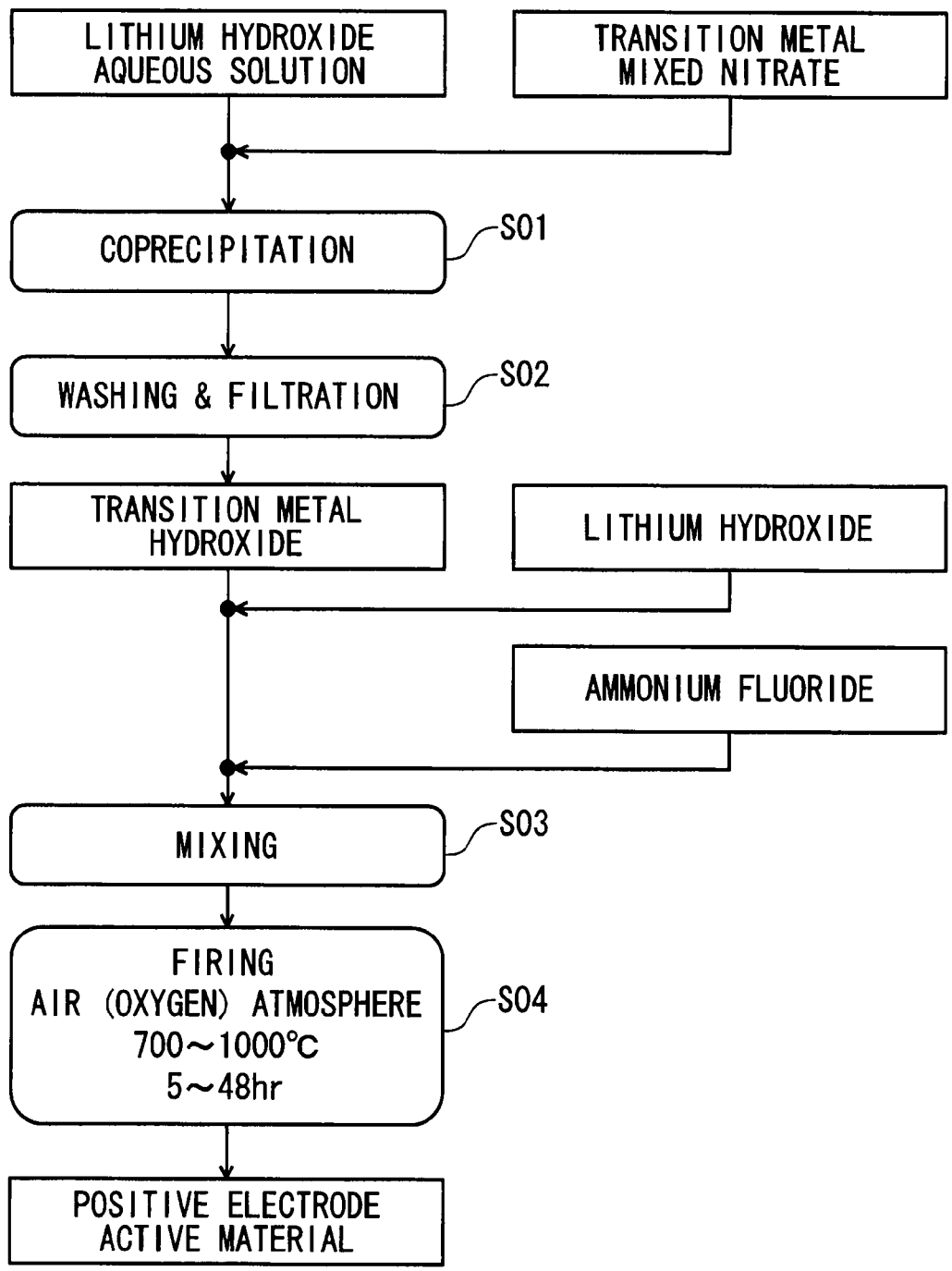
FIG. 12 is a process flowchart of a positive electrode active material manufacturing method according to a second embodiment.

While FIGS. 10 and 11 show a form in which the cells 21 are connected in series, to increase battery capacity, they may be connected in parallel or in a combination of series and parallel connections. Assembled battery packs may further be connected in series or in parallel.

According to the above-described present embodiment, by providing the non-aqueous electrolyte secondary battery having excellent charge and discharge cycle performance in the above-described third embodiment, a battery pack having excellent charge and discharge cycle performance can be provided.

The mode of the battery pack is changed as appropriate according to use. It is desirable that the use of the battery pack be such that the battery pack exhibits excellent cycle performance when high current is taken out. Specific examples include a use as the power source of digital cameras and uses in vehicles such as two- to four-wheel hybrid electric vehicles, two- to four-wheel electric vehicles and assisted bicycles. In particular, a battery pack using a non-aqueous electrolyte secondary battery excellent in high temperature characteristics is suitably used for use in vehicles.

EXAMPLES

Example 1

$Li_{1.2}Ni_{0.2}Mn_{0.6}O_{1.8}F_{0.2}$ where a=0.2, b=0.6, c=0.2, d=e=0 and x=0.2 in the above general formula was synthesized as the positive electrode active material. At this time, the value of the formula (1) was 3.67. 88% mass of this positive electrode active material, 6% by mass of acetylene black as the conductive agent and 6% by mass of polyvinylidene fluoride (PVdF) were added to N-methylpyrrolidone (NMP) and mixed to thereby prepare a slurry. This slurry was applied to both surfaces of a collector formed of an aluminum foil with a thickness of 15 μm, and then, dried and pressed, thereby forming a test electrode.

This test electrode was evaluated by using a three-electrode cell. For the counter electrode and the reference electrode, metallic lithium was used.

The initial charging capacity was the charging capacity when the three-electrode cell was charged to 4.6 V with a constant current at a rate of 0.1 C and then, charged until the current value converged in a constant voltage mode. The initial discharging capacity was the discharging capacity when the three-electrode cell was discharged from the fully charged state to 2.0 V with a constant current at a rate of 0.1 C. Moreover, the initial coulombic efficiency was a ratio of the initial discharging capacity to the initial charging capacity.

Examples 2 to 9

As other examples, positive electrode active materials shown in Table 1 were synthesized. The electrode forming method and the evaluation method were the same as those of Example 1 except that the composition of the start material was different from that of Example 1.

Comparative Example 1

As a comparative example, a positive electrode active material $Li_{1.2}Ni_{0.2}Mn_{0.6}O_2$ having no fluorine was synthesized (x=0). Other electrode forming method and evaluation method were similar to those of Example 1.

Comparative Example 2

$Li_{1.2}Ni_{0.3}Mn_{0.5}O_{1.8}F_{0.2}$ where a=0.2, b=0.5, c=0.3, d=e=0 and x=0.05 in the above general formula was synthesized. Other electrode forming method and evaluation method were similar to those of Example 1.

Comparative Example 3

$Li_{1.2}Ni_{0.25}Mn_{0.55}O_{1.8}F_{0.2}$ where a=0.2, b=0.55, c=0.25, d=e=0 and x=0.1 in the above general formula was synthesized. At this time, the value of the formula (1) is 4. Other electrode forming method and evaluation method were similar to those of Example 1.

TABLE 1

| | a | b | c | d | e | x | COMPOSITION | INITIAL CHARGING CAPACITY (mAh/g) | INITIAL DISCHARGING CAPACITY (mAh/g) | INITIAL COULOMBIC EFFICIENCY (%) |
|---|---|---|---|---|---|---|---|---|---|---|
| EXAMPLE 1 | 0.2 | 0.6 | 0.2 | 0 | 0 | 0.1 | $Li_{1.2}Ni_{0.2}Mn_{0.6}O_{1.9}F_{0.1}$ | 234.0 | 151.1 | 65.9 |
| EXAMPLE 2 | 0.2 | 0.6 | 0.2 | 0 | 0 | 0.2 | $Li_{1.2}Ni_{0.2}Mn_{0.6}O_{1.8}F_{0.2}$ | 223.0 | 183.0 | 82.1 |
| EXAMPLE 3 | 0.2 | 0.6 | 0.2 | 0 | 0 | 0.3 | $Li_{1.2}Ni_{0.2}Mn_{0.6}O_{1.7}F_{0.3}$ | 174.6 | 142.1 | 81.4 |
| EXAMPLE 4 | 0.2 | 0.6 | 0.2 | 0 | 0 | 0.4 | $Li_{1.2}Ni_{0.2}Mn_{0.6}O_{1.6}F_{0.4}$ | 192.6 | 144.8 | 75.2 |
| EXAMPLE 5 | 0.33 | 0.67 | 0 | 0 | 0 | 0.1 | $Li_{1.33}Mn_{0.67}O_{1.9}F_{0.1}$ | 242.5 | 167.1 | 68.9 |
| EXAMPLE 6 | 0.33 | 0.67 | 0 | 0 | 0 | 0.33 | $Li_{1.33}Mn_{0.67}O_{1.67}F_{0.33}$ | 226.7 | 182.5 | 80.5 |
| EXAMPLE 7 | 0.2 | 0.4 | 0.4 | 0 | 0 | 0.2 | $Li_{1.2}Ni_{0.4}Mn_{0.4}O_{1.8}F_{0.2}$ | 213.7 | 176.3 | 82.5 |
| EXAMPLE 8 | 0.2 | 0.4 | 0 | 0.4 | 0 | 0.2 | $Li_{1.2}Mn_{0.4}Co_{0.4}O_{1.8}F_{0.2}$ | 233.8 | 190.1 | 81.3 |
| EXAMPLE 9 | 0.2 | 0.4 | 0 | 0 | 0.4 | 0.2 | $Li_{1.2}Mn_{0.4}Fe_{0.4}O_{1.8}F_{0.2}$ | 205.2 | 161.5 | 78.7 |
| COMPARATIVE EXAMPLE 1 | 0.2 | 0.6 | 0.2 | 0 | 0 | 0 | $Li_{1.2}Ni_{0.2}Mn_{0.6}O_2$ | 284.2 | 186.5 | 65.6 |
| COMPARATIVE EXAMPLE 2 | 0.2 | 0.6 | 0.2 | 0 | 0 | 0.05 | $Li_{1.2}Ni_{0.2}Mn_{0.6}O_{1.95}F_{0.05}$ | 243.8 | 152.7 | 62.6 |
| COMPARATIVE EXAMPLE 3 | 0.2 | 0.55 | 0.25 | 0 | 0 | 0.1 | $Li_{1.2}Ni_{0.25}Mn_{0.55}O_{1.9}F_{0.1}$ | 258.7 | 149.7 | 57.9 |

FIGS. 1 to 7 show the initial charge and discharge curves of the electrodes formed in Examples 1 to 4 and Comparative Examples 1 to 3. Table 1 shows the initial charging capacities, the initial discharging capacities and the initial coulombic efficiencies of the electrodes formed in Examples 1 to 9 and Comparative Examples 1 to 3. Compared with the initial coulombic efficiencies of the electrodes in Comparative Examples 1 to 3, the initial coulombic efficiencies of the electrodes in Examples 1 to 9 exhibited high values. The initial charging capacities of the electrodes in Examples 1 to 9 were low compared with those of Comparative Examples 1 to 3. This is considered to indicate that in the positive electrode active materials in Examples 1 to 9, oxygen was partly substituted by fluorine and the valence of the manganese in the $Li_2MnO_3$ component partly became trivalent to thereby reduce the reaction accompanied by oxygen desorption in the initial charging and this improved the coulombic efficiency.

While certain embodiment has been described, the embodiment has been presented by way of example only, and is not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A positive electrode active material for a non-aqueous electrolyte secondary battery, the positive electrode active material having a formula Li(Li$_a$Mn$_b$Ni$_c$Co$_d$Fe$_e$)O$_{2-x}$F$_x$, wherein a, b, c, d, e, and x satisfy 0.2≤a≤0.33, 0<b≤0.67, 0≤c<1, 0≤d<1, 0≤e<1, and 0.2≤x≤1−b, and wherein formula (1) is satisfied:

$$3 \le \frac{3-x-a-2c-3d-3e}{b} < 3.66. \quad (1)$$

2. The positive electrode active material of claim 1, in which 0.4<b≤0.67.

3. The positive electrode active material of claim 1, in which 0.6<b≤0.67.

4. The positive electrode active material of claim 1, capable of providing an initial coulombic efficiency of at least 75.2%.

5. The positive electrode active material of claim 1, wherein 0.3≤x≤1−b.

6. The positive electrode active material of claim 1, wherein 0.2<x≤1−b.

7. A non-aqueous electrolyte secondary battery comprising:
a positive electrode comprising the positive electrode active material of claim 1;
a negative electrode comprising a negative electrode active material; and
a non-aqueous electrolyte.

8. The battery of claim 7 further comprising a container formed of a laminate film.

9. A battery pack comprising at least one non-aqueous electrolyte secondary battery according to claim 8.

10. The battery pack of claim 9, comprising a plurality of the non-aqueous electrolyte secondary batteries that are electrically connected with each other, and further comprising a protecting circuit capable of detecting a voltage of each of the non-aqueous electrolyte secondary batteries.

11. The battery of claim 7, further comprising a negative electrode terminal which is electrically connected to the negative electrode and comprises aluminum or an aluminum alloy comprising Mg, Ti, Zn, Mn, Fe, Cu, or Si.

12. The battery of claim 7, further comprising a positive electrode terminal which is electrically connected to the positive electrode and comprises aluminum or an aluminum alloy comprising Mg, Ti, Zn, Mn, Fe, Cu, or Si.

13. The battery of claim 7, wherein the negative electrode comprises a negative electrode collector comprising an aluminum foil or an aluminum alloy foil comprising Mg, Ti, Zn, Mn, Fe, Cu, or Si.

14. The battery of claim 7, wherein the positive electrode comprises a positive electrode collector comprising an aluminum foil or an aluminum alloy foil containing Mg, Ti, Zn, Mn, Fe, Cu, or Si.

15. The battery of claim 7 further comprising a container which is a metal case with a thickness of not more than 1.0 mm.

16. A method for manufacturing the positive electrode active material of claim 1, the method comprising:
mixing at least a transition metal hydroxide, lithium hydroxide, and ammonium fluoride together, thereby obtaining a mixture and
firing the mixture at a temperature of not less than 700 degrees C. and not more than 1000 degrees C. for not less than five hours and not more than 48 hours.

17. The method of claim 16, wherein the transition metal hydroxide is synthesized by a coprecipitation method.

* * * * *